W. W. NICHOLS & C. H. KELSEA.
DISPENSING APPARATUS.
APPLICATION FILED JAN. 31, 1914. RENEWED JAN. 24, 1917.

1,238,182.

Patented Aug. 28, 1917.

Witnesses.
J. Morrill Fuller
William E. Gager

Inventors.
Walter W. Nichols,
Clarence H. Kelsea,
by Heard Smith & Tennant.
Att y's'

UNITED STATES PATENT OFFICE.

WALTER W. NICHOLS, OF MELROSE, AND CLARENCE H. KELSEA, OF LYNN, MASSACHUSETTS, ASSIGNORS TO GEORGE A. WILLIAMS, OF BOSTON, MASSACHUSETTS.

DISPENSING APPARATUS.

1,238,182. Specification of Letters Patent. Patented Aug. 28, 1917.

Application filed January 31, 1914, Serial No. 815,817. Renewed January 24, 1917. Serial No. 144,311.

*To all whom it may concern:*

Be it known that we, WALTER W. NICHOLS and CLARENCE H. KELSEA, citizens of the United States, and residents of Melrose, county of Middlesex, and Lynn, county of Essex, State of Masachusetts, respectively, have invented an Improvement in Dispensing Apparatus, of which the following description, in connection with the acompanying drawing, is a specification, like characters on the drawing representing like parts.

This invention relates to a dispensing apparatus specially designed for dispensing granular material such for instance as granulated sugar and the object of the invention is to provide a novel dispensing apparatus which can be used in restaurants, dairy lunches and similar places for delivering individual portions of sugar into a cup or receptacle, which apparatus will operate freely and will not become clogged up by the granular material.

In order to give a proper understanding of our invention we will describe herein a selected embodiment thereof and will then point out the novel features in the appended claims.

Referring to the drawings, Figure 1 is a perspective view of a dispensing apparatus embodying our invention;

Figure 1:
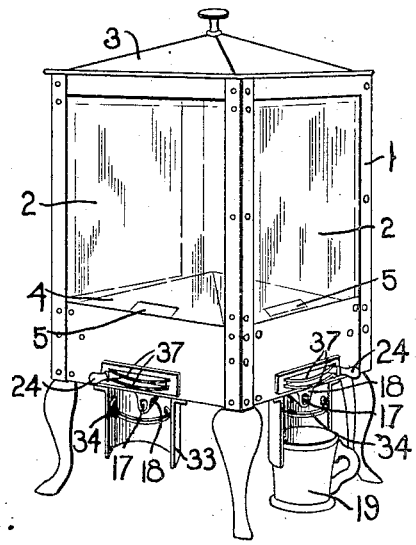

The entire apparatus comprises a casing or container 1 which will preferably have sides 2 of glass or other transparent material and a removable cover 3 through which the sugar or other material can be placed therein and one or more measuring valve devices adapted upon each actuation thereof to deliver a measured quantity of the granular material from the container. There may be, if desired, a number of these valve devices and the device shown in the drawing has one such valve at each side thereof. Inasmuch as these measuring valve devices are all of the same construction a description of one will suffice. The bottom 4 of the container 1 is shown as being raised or crowned in its central portion and it has formed therein at each side of the container a discharge opening 5 through which the material is discharged to the measuring valve device. The valve device herein shown has been specially designed so that it will freely operate without becoming clogged up by the granular material. As herein shown the bottom 4 of the container is provided with a depending boss or extension 8 at each of the discharge openings 5, each boss constituting a positioning device for holding the measuring valve device in operative position. Our improved valve device comprises a casing 9 having a cylindrical valve-receiving chamber and a measuring valve member 10 operating in said chamber. The boss 8 is rabbeted circumferentially as at 11 and the upper portion of the valve casing 9 is received in the rabbet 11. The bottom 12 of the valve casing is shown as separate from the sides thereof and is held in position in any suitable way as by means of clamping screws 14 which screw into lateral flanges 15 extending from opposite sides of the portion 9. This valve casing bottom 12 is provided with an annular rib or flange 16 which sets inside the cylindrical portion 9 and serves to hold the parts firmly in their proper position. The bottom 12 is provided with a discharge opening 17 which has a discharge spout 18 associated therewith for directing each charge of sugar into the cup 19.

Figure 2:
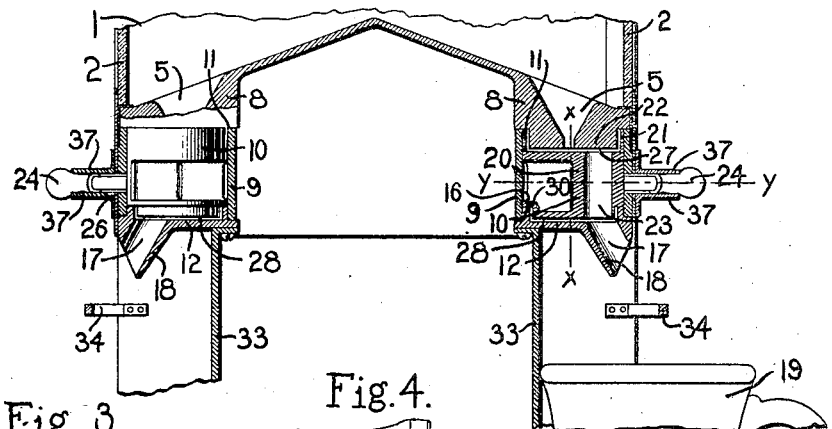
Fig. 2 is an enlarged sectional view through the lower part of the apparatus showing the measuring valves.
Figure 4:
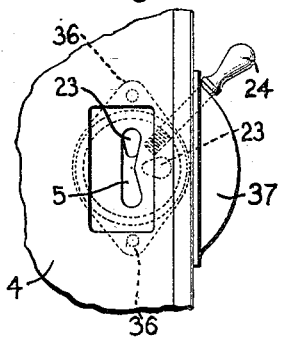
Fig. 4 is a plan view of Fig. 3.
Figure 5:
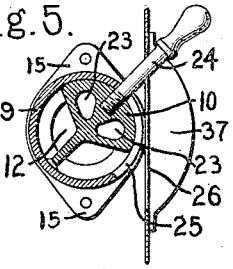
Fig. 5 is a section on the line $y$—$y$, Fig. 2.

The valve itself is shown at 10 and it is mounted to turn about a vertical axis within the valve casing 9. This valve is provided at its upper end with the upwardly directed annular lip 21 which fits against the interior of the valve casing 9 at the upper end and also surrounds the portion 22 of the extension 8 formed by the rabbet 11. The valve is provided with one or more ports 23, two being shown in this embodiment of the invention and it is operated by a handle 24 which extends through a slot 25 in the valve casing 9 and through a slot 26 in the front wall of the casing. In the particular construction herein illustrated the discharge opening 5 is an elongated opening as shown best in Fig. 2, and the two ports 23 in the valve and the discharge port 17 are so disposed relative to each other that when the valve is at the extreme limit of its movement in one direction, as shown in Figs. 4 and 5, one of the ports 23 registers with the discharge opening 5 while the other port 23 registers with the outlet port 17 and when the valve is moved to its extreme position in the other direction, the first-named port 23 registers with the discharge opening 17, while the other port 23 registers with the discharge opening 5.

The valve is of such dimensions that the chambers or ports 23 therein have a volume equal to one serving of sugar and we preferably make this volume about equal to a heaping teaspoonful of sugar. When the valve is in the position shown in Figs. 4 and 5 one of the ports 23 will become filled with sugar and when the valve is turned into its extreme position in the opposite direction, said port will be brought over the discharge port 17 allowing the measured quantity of sugar to be discharged from the device while the other port will be brought into register with the opening 5 and thus will receive another measured quantity of sugar. The bringing of the valve back into its initial position again will deliver the second charge of sugar from the second port 23 while the first port will again be filled with sugar. A movement of the valve, therefore, in either direction will deliver a measured quantity of sugar.

Figure 3:
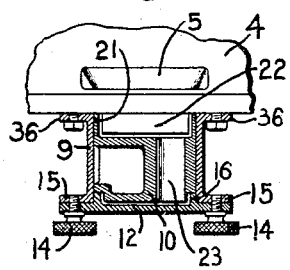
Fig. 3 is a section on the line $x$—$x$, Fig. 2.

In order to prevent the bearings of the valve from becoming clogged or stuck up with sugar, we have provided a construction wherein a space is left between the valve and both the top and bottom of the valve chamber, each of which spaces has a greater dimension in a vertical direction than the greatest diameter of the particles of sugar. This construction is perhaps best seen in Figs. 2 and 3 wherein the valve 20 is so formed as to leave a clearance space 27 between the top of the valve and the bottom of the portion 22 and also another clearance space 28 between the bottom of the valve and the bottom of the valve chamber. Moreover the rabbet 11 is of such a depth that this clearance space extends up around the portion 22 of the depending projection 8 and the lower end of the valve is also rabbeted as at 30 so that the clearance space 28 extends up around the bottom edge of the valve to the top of the annular flange 16. When the valve is in use the particles of sugar will accumulate in the spaces 27 and 28 but because these spaces are of greater dimension in a vertical direction than the diameter of the sugar particles and because each clearance space is shaped to prevent an upwardly directed annular portion at its periphery, the sugar particles will not work around into and between the bearing surfaces of the valve. In other words, these clearance spaces disposed and shaped as they are, prevent the sugar particles from working between the relatively movable contacting surfaces of the valve and the valve casing. We have found from demonstration that a valve constructed as above described with the clearance spaces top and bottom will not become clogged up or stuck up by the grinding of the sugar particles between the bearing surfaces.

Each of the valve devices is provided with a cup positioning member 33 in the form of an apron secured to the casing 1 and depending therefrom below the discharge spout, each apron having a shape and position to hold the cup 19 in proper position to receive the measured quantity of sugar.

In order to prevent persons from raising the cup up sufficiently high to permit the nozzle 18 to be immersed in the liquid in the cup, we provide a guard member 34 for each apron, said guard member being in the form of a bar extending from one side to the other of the apron and situated slightly below the nozzle 18, each guard member being curved outwardly sufficiently so that it will not interfere with the proper delivery of the sugar.

The bottom 12 of the valve casing is readily removable and the handle 24 of the valve is also removable so that if it is necessary to clean or repair the valve it can be readily taken from its casing by simply removing the bottom 12 and the handle 24. The valve casing may be secured to the bottom of the container 1 in any suitable way. We have herein shown the upper part of said valve casing as provided with the lateral flanges 36 bolted or screwed to the bottom of the projection 8. We have also shown the casing as provided with guiding flanges 37 between which the handle 34 operates.

While we have illustrated herein one embodiment of our invention, we do not wish to be limited to the construction shown.

Having described our invention, what we claim as new and desire to secure by Letters Patent is:—

1. In an apparatus for dispensing granular material, the combination with a container having a discharge opening in its bottom, of a circular valve casing beneath said discharge opening and provided with a discharge spout in its under side situated out of line with the discharge opening, an oscillatory valve member within the valve casing and held in position by engagement with the walls thereof, said valve member having a measuring chamber which is put alternately into communication with the discharge opening and discharge spout by oscillatory movement of the valve member, the upper end of said valve member being provided with a recess, and a projection depending from the container bottom and entering said recess but spaced from the walls thereof thereby to provide a cup-shaped clearance space.

2. In an apparatus for dispensing granular material, the combination with a container having a bottom with a discharge opening therethrough, of a circular valve casing situated beneath said discharge opening and provided in its under side with a discharge spout, an oscillatory valve member situated within the valve casing and held in position by engagement with the walls thereof, said valve member having a measuring chamber which is put in communication with the discharge opening and discharge spout alternately as the valve member is oscillated, the bottom of the valve casing having a recess therein and the valve member having a projection extending into said recess but spaced from the walls thereof whereby a cup-shaped clearance space is provided between the lower side of the valve member and the bottom of the valve casing.

3. In an apparatus for dispensing granular material, the combination with a container having a bottom with a discharge opening therethrough and a discharge spout, of a measuring valve device comprising a valve casing having a cylindrical valve chamber, an oscillatory valve member within the chamber and having bearing against the wall thereof, said member having a measuring chamber which is placed in communication with the discharge opening and the discharge spout alternately as the valve is oscillated, said valve chamber being constructed to present a cup-shaped clearance space between the top and bottom thereof and the valve member.

4. In an apparatus for dispensing granular material, the combination with a container having a bottom provided with a positioning projection and a discharge opening therethrough, of a discharge spout beneath said projection, a measuring valve device between said projection and discharge spout and comprising a valve casing secured to said projection, an oscillatory valve member within the valve chamber and having bearing against the wall thereof, said valve member having a measuring chamber which is placed in communication with the discharge opening and the discharge spout alternately by movement of said valve member, said valve member and projection forming between them a cup-shaped clearance space which prevents granules of sugar from working into the bearing between the valve member and the valve casing.

5. In an apparatus for dispensing granular material, the combination with a container having a bottom provided with a positioning projection and a discharge opening therethrough, of a discharge spout beneath said projection, a measuring valve device between said projection and discharge spout and comprising a valve casing secured to said projection, an oscillatory valve member within the valve chamber and having bearing against the wall thereof, said valve member having a measuring chamber which is placed in communication with the discharge opening and the discharge spout alternately by movement of said valve member, said valve member having such a relation to the projection and to the bottom of the valve casing as to form a clearance space at the top and bottom of the valve member which retains sugar granules and prevents them from working between the bearing surfaces.

In testimony whereof, we have signed our names to this specification, in the presence of two subscribing witnesses.

WALTER W. NICHOLS.
CLARENCE H. KELSEA.

Witnesses:
BERTHA F. HEUSER,
THOMAS J. DRUMMOND.

Copies of this patent may be obtained for five cents each, by addressing the "Commissioner of Patents, Washington, D. C."